(12) United States Patent
Halter et al.

(10) Patent No.: US 8,905,751 B2
(45) Date of Patent: Dec. 9, 2014

(54) MOLDING MACHINE HAVING AUXILIARY EJECTION-ASSISTANCE ASSEMBLY CONFIGURED TO APPLY ADDITIONAL EJECTION FORCE

(75) Inventors: Christophe Halter, Selange (BE); Arnold Heinz Mai, Irrel (DE)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 13/995,833

(22) PCT Filed: Dec. 13, 2011

(86) PCT No.: PCT/CA2011/050767
§ 371 (c)(1),
(2), (4) Date: Jun. 19, 2013

(87) PCT Pub. No.: WO2012/100324
PCT Pub. Date: Aug. 2, 2012

(65) Prior Publication Data
US 2013/0295221 A1  Nov. 7, 2013

Related U.S. Application Data

(60) Provisional application No. 61/437,062, filed on Jan. 28, 2011.

(51) Int. Cl.
*B29C 45/40* (2006.01)
*B29C 49/70* (2006.01)
*B29C 45/67* (2006.01)
*B29C 65/00* (2006.01)
*B29C 45/43* (2006.01)
*B29C 45/82* (2006.01)

(52) U.S. Cl.
CPC ... *B29C 45/4005* (2013.01); *B29C 2945/76892* (2013.01); *B29C 2049/707* (2013.01); *B29C 45/67* (2013.01); *B29C 66/8242* (2013.01); *B29C 2049/708* (2013.01); *B29C 45/40* (2013.01); *B29C 45/43* (2013.01); *B29C 2045/824* (2013.01)
USPC .......................................... 425/556; 425/442

(58) Field of Classification Search
CPC .... B29C 45/40; B29C 45/4005; B29C 45/67; B29C 45/70; B29C 66/8242; B29C 2945/76892; B29C 2049/707; B29C 2049/708; B29C 2045/4005; B29C 45/43; B29C 2045/824
USPC ............... 425/441, 442, 436 R, 436 RM, 556
See application file for complete search history.

(56) References Cited

U.S. PATENT DOCUMENTS 5,052,910 A * 10/1991 Hehl ............................ 425/150
5,374,177 A   12/1994 Hehl
(Continued)

FOREIGN PATENT DOCUMENTS

DE   102010034451 A1   3/2011
JP     2008100403 A     5/2008

OTHER PUBLICATIONS

PCT International Search Report, Pengfei Zhang, Feb. 6, 2012, 4 pages.

*Primary Examiner* — Yogendra Gupta
*Assistant Examiner* — Emmanuel S Luk

(57) ABSTRACT

A molding machine comprises a machine ejection assembly and an auxiliary ejection assistant assembly coupled to the machine ejection assembly, wherein the auxiliary assistant assembly is used to generate an additional ejecting force.

9 Claims, 4 Drawing Sheets

(56) References Cited

U.S. PATENT DOCUMENTS

Figure 1A:
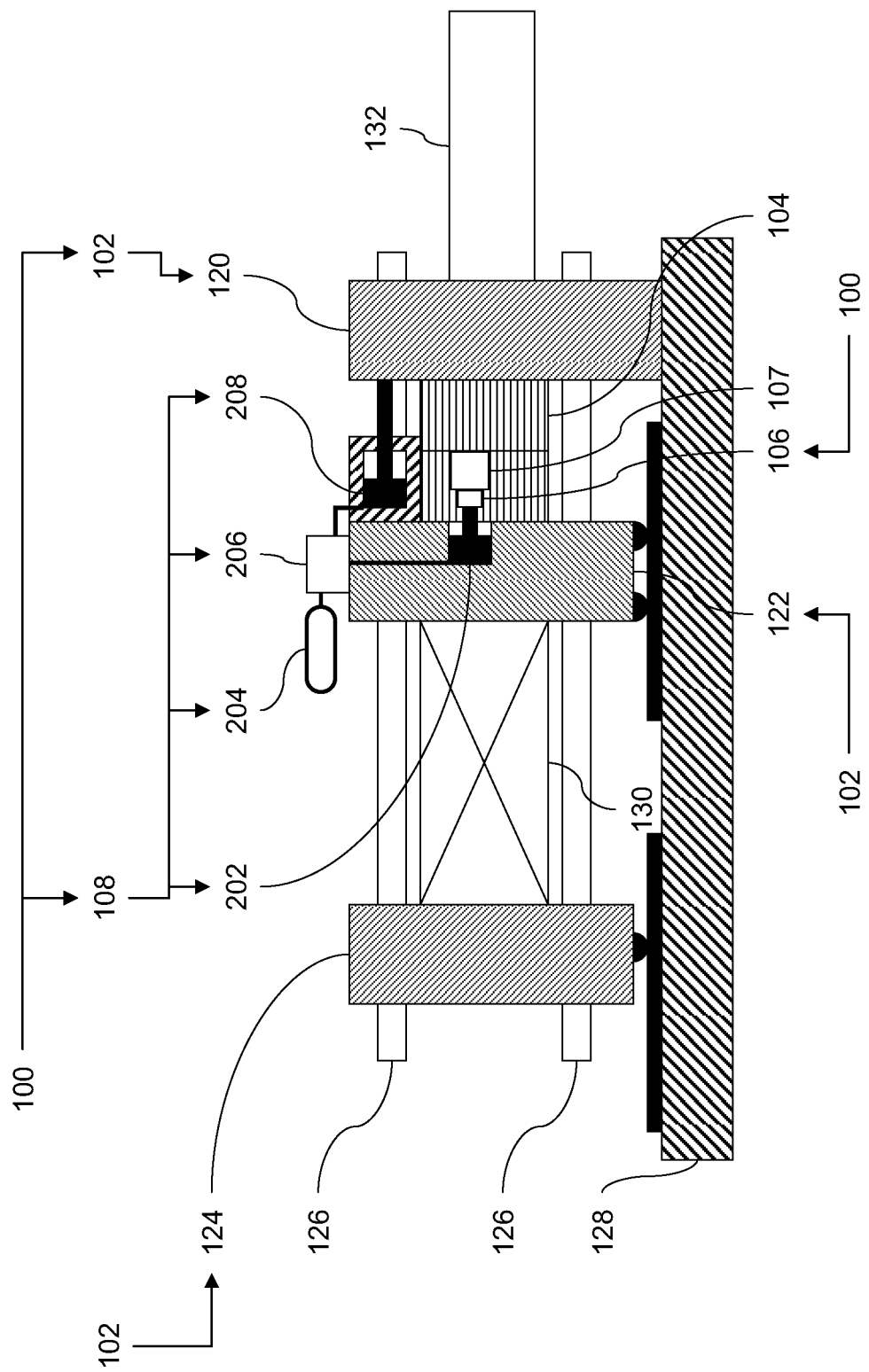

| | | | |
|---|---|---|---|
| 5,662,952 A * | 9/1997 | Den Uyl et al. | 425/556 |
| 6,056,535 A * | 5/2000 | Shimizu | 425/556 |
| 6,394,787 B1 * | 5/2002 | Kobayashi | 425/577 |
| 6,527,540 B1 * | 3/2003 | Dantlgraber | 425/595 |
| 6,796,782 B2 * | 9/2004 | Bauer | 425/149 |
| 7,086,851 B2 * | 8/2006 | Ickinger et al. | 425/556 |
| 7,462,319 B2 * | 12/2008 | Keir et al. | 264/328.8 |
| 7,537,443 B2 * | 5/2009 | Jinno et al. | 425/190 |
| 7,828,540 B2 * | 11/2010 | Dantlgraber | 425/145 |
| 8,002,532 B2 * | 8/2011 | Stirn et al. | 425/139 |
| 8,444,409 B2 * | 5/2013 | Eppich | 425/444 |
| 8,622,733 B2 * | 1/2014 | Chen | 425/556 |
| 2002/0168443 A1 * | 11/2002 | Bauer | 425/556 |
| 2003/0090018 A1 * | 5/2003 | Bulgrin | 264/40.1 |
| 2003/0175381 A1 * | 9/2003 | Wohlrab | 425/589 |
| 2004/0105910 A1 * | 6/2004 | Ickinger et al. | 425/556 |
| 2006/0070378 A1 * | 4/2006 | Geiger | 60/475 |
| 2006/0125148 A1 * | 6/2006 | Keir et al. | 264/328.1 |
| 2006/0233912 A1 * | 10/2006 | Reinhardt | 425/595 |
| 2006/0240142 A1 * | 10/2006 | Shin et al. | 425/595 |
| 2007/0059397 A1 * | 3/2007 | Goinski | 425/557 |
| 2007/0194474 A1 | 8/2007 | Nagy et al. | |
| 2008/0026095 A1 * | 1/2008 | Wessely et al. | 425/556 |
| 2008/0050464 A1 * | 2/2008 | Dantlgraber | 425/556 |
| 2008/0089964 A1 * | 4/2008 | Kianpour et al. | 425/150 |
| 2008/0199556 A1 * | 8/2008 | Dantlgraber | 425/542 |
| 2010/0283186 A1 * | 11/2010 | Notz | 264/328.1 |
| 2011/0064843 A1 * | 3/2011 | Eppich | 425/556 |
| 2012/0074616 A1 * | 3/2012 | Halter et al. | 264/297.1 |
| 2012/0093968 A1 * | 4/2012 | Yuan | 425/542 |
| 2013/0251842 A1 * | 9/2013 | Takeuchi et al. | 425/556 |

* cited by examiner

MOLDING MACHINE HAVING AUXILIARY EJECTION-ASSISTANCE ASSEMBLY CONFIGURED TO APPLY ADDITIONAL EJECTION FORCE

TECHNICAL FIELD

An aspect generally relates to (and is not limited to) molding machines having an auxiliary ejection-assistance assembly.

BACKGROUND

United States Patent Publication Number 2008/0026095 discloses an injection molding machine includes an injection unit and a clamping unit. The injection unit includes a barrel and a plasticizing screw which is supported in the barrel for rotation and movement in axial direction. A first direct drive causes the plasticizing screw to rotate in order to plasticize thermoplastic material, and a hydraulic drive causes the plasticizing screw to move axially in order to effect an injection stroke. The hydraulic drive includes a hydraulic accumulator system which is comprised of a variable capacity pump in combination with a hydraulic accumulator. The clamping unit includes a toggle mechanism for moving a movable platen in relation to a stationary support platen, a spindle mechanism for operating the toggle mechanism, and a second direct drive for operating the spindle mechanism United States Patent Publication Number 2007 0194474 discloses an injection press that has a hydraulic cylinder and a press piston located inside the hydraulic cylinder that is translatable within the cylinder. The press piston divides the hydraulic cylinder into engage and retract chambers. A pump and an auxiliary pressurization device are connected to the engage chamber. A transducer measures the pressure in the engage chamber. A controller receives signals from the transducer and operates the pump. The pump delivers hydraulic fluid to the engage chamber to pressurize and inject resin into a mold cavity through the piston. The controller discontinues operation of the pump when the pressure in the engage chamber reaches a specified cut-off level. The auxiliary pressurization device maintains pressure on the fluid in the engage chamber after the controller discontinues operation of the pump to provide back pressure on the injected resin. The auxiliary pressurization device may be an accumulator that is charged by the pump. Safety devices prevent the controller from operating the pump during unsafe conditions.

SUMMARY

The inventors have researched a problem associated with known molding systems that inadvertently manufacture bad-quality molded articles or parts. After much study, the inventors believe they have arrived at an understanding of the problem and its solution, which are stated below, and the inventors believe this understanding is not known to the public.

According to one aspect, there is provided a molding machine (100), comprising: a machine-ejection assembly (106); and an auxiliary ejection-assistance assembly (108) being coupled to the machine-ejection assembly (106).

According to another aspect, there is provided a molding machine (100), comprising: a machine-ejection assembly (106) being supported by a platen assembly (102), the platen assembly (102) being configured to support, in use, a mold assembly (104), the machine-ejection assembly (106) being configured to provide, in use, an ejection force to a molded part (107) being located in the mold assembly (104), the ejection force for ejecting the molded part (107) from the mold assembly (104); and an auxiliary ejection-assistance assembly (108) being coupled to the machine-ejection assembly (106), the auxiliary ejection-assistance assembly (108) being configured to apply, in use, an additional ejection force being usable for ejecting, in use, the molded part (107) from the mold assembly (104).

Other aspects and features of the non-limiting embodiments will now become apparent to those skilled in the art upon review of the following detailed description of the non-limiting embodiments with the accompanying drawings.

DETAILED DESCRIPTION OF THE DRAWINGS

The non-limiting embodiments will be more fully appreciated by reference to the following detailed description of the non-limiting embodiments when taken in conjunction with the accompanying drawings, in which:

FIGS. 1A, 1B, 2, 3 depict schematic representations (examples) of a molding machine (100).

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

FIGS. 1A, 1B, 2, 3 depict schematic representations of a molding machine (100). The molding machine (100) may include components that are known to persons skilled in the art, and these known components will not be described here; these known components are described, at least in part, in the following reference books (for example): (i) "*Injection Molding Handbook*" authored by OSSWALD/TURNG/GRAMANN (ISBN: 3-446-21669-2), (ii) "*Injection Molding Handbook*" authored by ROSATO AND ROSATO (ISBN: 0-412-99381-3), (iii) "*Injection Molding Systems*" 3rd Edition authored by JOHANNABER (ISBN 3-446-17733-7) and/or (iv) "*Runner and Gating Design Handbook*" authored by BEAUMONT (ISBN 1-446-22672-9). It will be appreciated that for the purposes of this document, the phrase "includes (but is not limited to)" is equivalent to the word "comprising". The word "comprising" is a transitional phrase or word that links the preamble of a patent claim to the specific elements set forth in the claim which define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim.

Figure 1B:
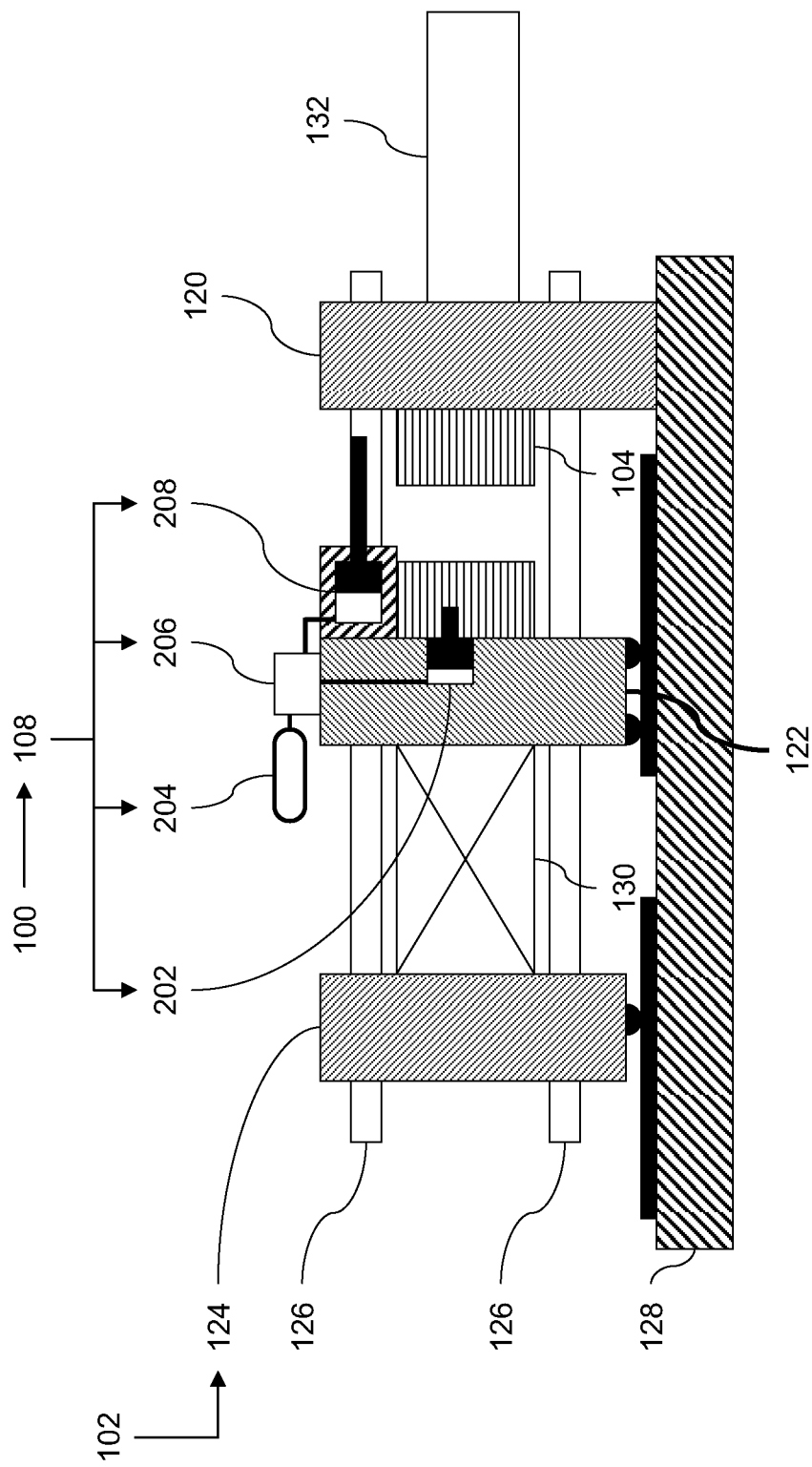

FIGS. 1A, 1B depict a first example of the molding machine (100). The molding machine (100) may include (and is not limited to): (i) a machine-ejection assembly (106), and (ii) an auxiliary ejection-assistance assembly (108). A platen assembly (102) is configured to support, in use, a mold assembly (104). The machine-ejection assembly (106) is supported by the platen assembly (102). The machine-ejection assembly (106) is configured to provide, in use, an ejection force to a molded part (107) that is located in the mold assembly (104). The ejection force is used for ejecting the molded part (107)

from the mold assembly (104). The auxiliary ejection-assistance assembly (108) is coupled to the machine-ejection assembly (106). The auxiliary ejection-assistance assembly (108) is configured to apply, in use, an additional ejection force that is usable for ejecting, in use, the molded part (107) from the mold assembly (104).

The platen assembly (102) may include, by way of example as depicted in FIGS. 1A and 1B (and is not limited to): (i) a stationary platen (120), (ii) a movable platen (122) that is movable relative to the stationary platen (120), and (iii) a movable clamp platen (124). It will be appreciated that the auxiliary ejection-assistance assembly (108) may be used in a molding system (not depicted) in which the movable clamp platen (124) is not used. Tie bars (126) extend between the platens of the platen assembly (102). The stationary platen (120) is mounted and connected to a frame (128). The movable platen (122) and the movable clamp platen (124) are movable along the frame (128). A clamp assembly (130) is mounted between the movable clamp platen (124) and the movable platen (122). The clamp assembly (130) is configured to apply, in use, a clamp force to the movable platen (122) as known to those skilled in the art. An injection unit (132) is connected to the mold assembly (104) so as to supply a melt to the mold assembly (104) in accordance to methods known to those skilled in the art.

More specifically, the auxiliary ejection-assistance assembly (108) may be configured to receive, in use, the additional force as a result of a movement of the platen assembly (102), such as during a mold-assembly movement operation (so as to open and close the mold assembly (104).

More specifically (by way of example), the machine-ejection assembly (106) may include (and is not limited to): (i) an ejection rod (known but not depicted) abutting the molded part (107) located in the mold assembly (104), and (ii) an ejection actuator (known but not depicted) that is configured to provide, in use, the ejection force to the ejection rod, so that the ejection rod ejects, in use, the molded part (107) from the mold assembly (104).

Figure 2:
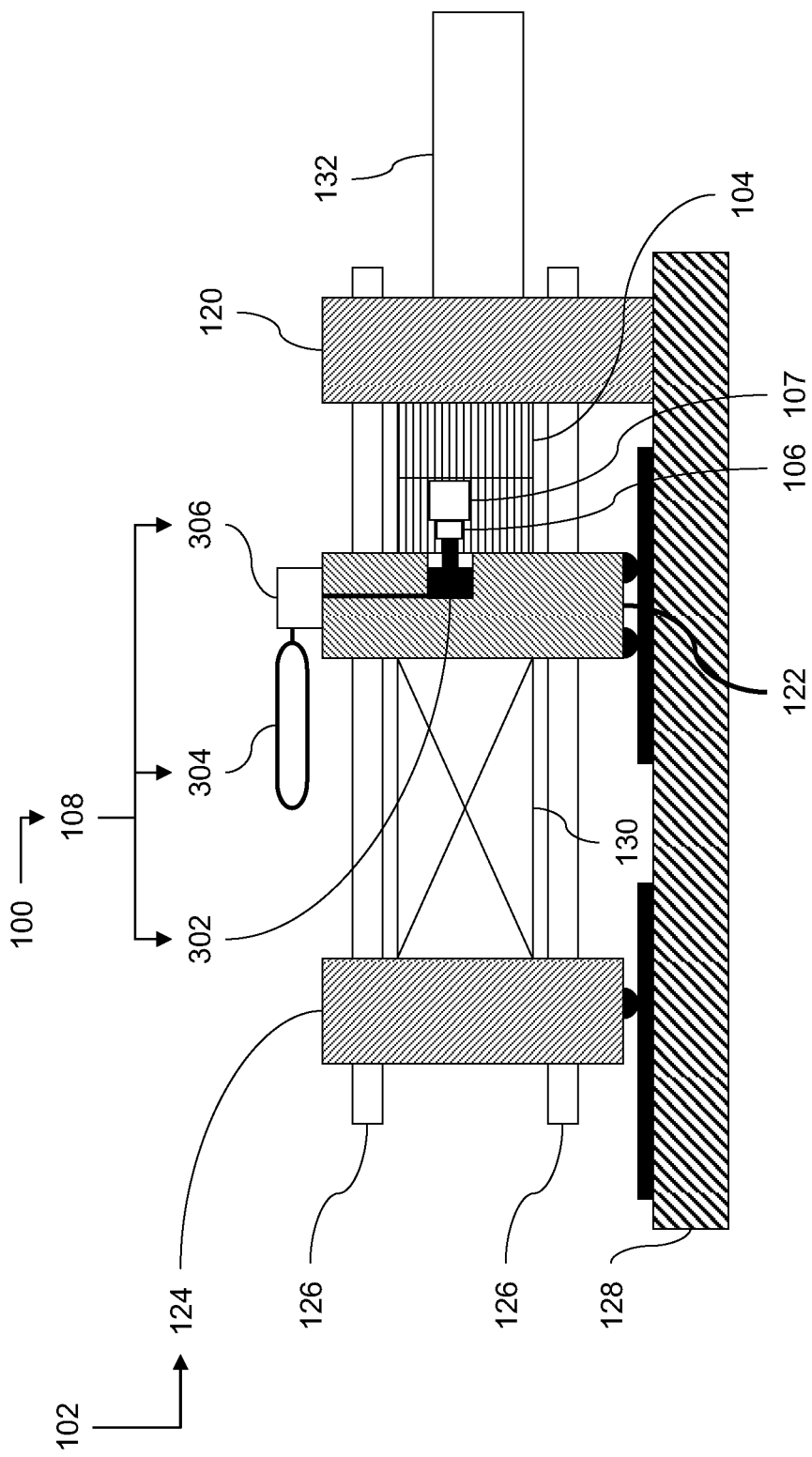
Figure 3:
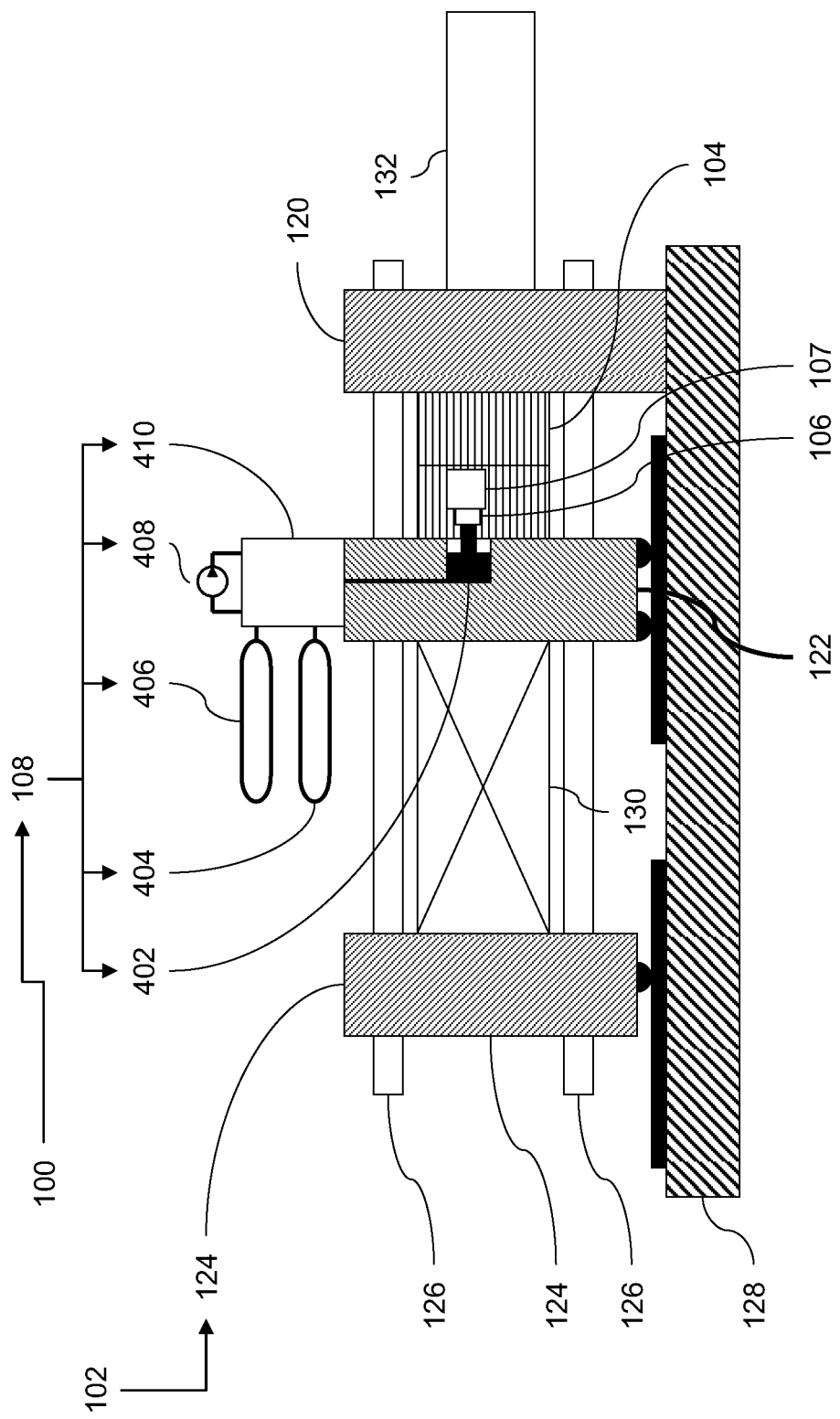

By way of example as depicted in FIGS. 1A, 1B, the auxiliary ejection-assistance assembly (108) may include (and is not limited to): an accumulator bottle (204) that is configured to apply the additional ejection force to the machine-ejection assembly (106). By way of example as depicted in FIG. 2, the auxiliary ejection-assistance assembly (108) may include (and is not limited to): an accumulator bottle (304) that is configured to apply the additional ejection force to the machine-ejection assembly (106). By way of example as depicted in FIG. 3, the auxiliary ejection-assistance assembly (108) may include (and is not limited to): the high pressure accumulator bottle (404) that is configured to apply the additional ejection force to the machine-ejection assembly (106).

Returning to FIGS. 1A. 1B, the auxiliary ejection-assistance assembly (108) (by way of the example depicted in FIGS. 1A, 1B) may include (and is not limited to): a booster cylinder (202), an accumulator bottle (204), a control valve (206), and an intensifier cylinder (208). The booster cylinder (202) is connected to the control valve (206). The booster cylinder (202) is also connected with the machine-ejection assembly (106). The intensifier cylinder (208) is also connected to the control valve (206). The accumulator bottle (204) is connected to the control valve (206). The intensifier cylinder (208) is connected between the stationary platen (120) and the movable platen (122). The control valve (206) may be mounted to the movable platen (122). The accumulator bottle (204) may also be mounted to the movable platen (122).

The mold assembly (104) is depicted as being closed in FIG. 1A. During a mold closing operation, the intensifier cylinder (208) may be compressed between the stationary platen (120) and the movable platen (122) so as to pressurize nitrogen gas (or generally a fluid) located in the intensifier cylinder (208). Energy may then be stored in the accumulator bottle (204). Size and stroke of the intensifier cylinder (208) may be tailored to provide sufficient volume and pressure for the booster cylinder (202). When required, the booster cylinder (202) may be actuated by the control valve (206). As the booster cylinder (202) may be required for emergency cases, the accumulator bottle (204) may be charged with nitrogen gas, or other suitable fluid, and sized to be able to provide a certain number of cycles to the booster cylinder (202), and then after the cycles are completed, the accumulator bottle (204) may be either refilled or exchanged, etc. During a mold closing operation, the intensifier cylinder (208) may be compressed between the stationary platen (120) and the movable platen (122) so to pressurize the nitrogen gas in the accumulator bottle (204) so that energy may be stored in the accumulator bottle (204). When the extra ejection force or booting force may be required from the machine-ejection assembly (106), the control valve (206) may connect the accumulator bottle (204) to the booster cylinder (202). FIG. 1B depicts the mold assembly 9107) in an opened position. When required, the booster cylinder (202) may be actuated by the control valve (206).

FIG. 2 depicts a second example, in which the auxiliary ejection-assistance assembly (108) may include (and is not limited to): a booster cylinder (302), an accumulator bottle (304), and a control valve (306). The booster cylinder (302) is connected to the control valve (306). The booster cylinder (302) is connected to the machine-ejection assembly (106). The accumulator bottle (304) is connected to the control valve (306). For the case where the booster cylinder (302) may be required for emergency cases or situations, the accumulator bottle (304) may be charged with nitrogen gas (or other suitable fluid), and may be sized to be able to provide a certain number of cycles to the booster cylinder (302). After the cycles are completed, the accumulator bottle (304) may need either to be refilled or exchanged. When the additional ejection force (or boosting force) is required from the machine-ejection assembly (106), the control valve (206) may connect the accumulator bottle (304) to the booster cylinder (302).

FIG. 3 depicts a third example of the molding machine (100) in which the auxiliary ejection-assistance assembly (108) may include (and is not limited to): a booster cylinder (402), a high pressure accumulator bottle (404), a low pressure accumulator bottle (406), a compressor (408), a control manifold and valve assembly (410). The booster cylinder (402) is connected with the machine-ejection assembly (106), and is also connected with the control manifold and valve assembly (410). The high pressure accumulator bottle (404) is connected with the control manifold and valve assembly (410). The low pressure accumulator bottle (406) is connected with control manifold and valve assembly (410). The compressor (408) is connected with the control manifold and valve assembly (410). A closed circuit of nitrogen gas (or suitable fluid) is depicted in FIG. 3. After the booster cylinder (402) is moved forward, the machine-ejection assembly (106) may move the booster cylinder (402) back and send low pressure nitrogen gas towards the low pressure accumulator bottle 406). Once the high pressure accumulator bottle (404) has reached a low pressure level, the compressor (408) transfers nitrogen gas from the low pressure accumulator bottle (406) towards the high pressure accumulator bottle (404) thus re-pressurizing the high pressure accumulator bottle (404).

When the additional ejection force (or boosting force) is required from the machine-ejection assembly (106), the control manifold and valve assembly (410) connects the high pressure accumulator bottle (404) to the booster cylinder (402).

It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising". It is noted that the foregoing has outlined the non-limiting embodiments (examples). The description is made for particular non-limiting embodiments (examples). It is understood that the non-limiting embodiments are merely illustrative as examples.

What is claimed is:

1. A molding machine, comprising:
   a machine-ejection assembly comprising an ejection actuator configured to provide, in use, an ejection force to a molded part is located in a mold assembly, the ejection force for ejecting the molded part from the mold assembly; and
   an auxiliary ejection-assistance assembly being coupled to the machine-ejection assembly and configured to apply, in use, an additional ejection force being usable for ejecting, in use, the molded part from the mold assembly, the auxiliary ejection-assistance assembly including an accumulator bottle that is configured to apply the additional ejection force to the ejection actuator.

2. A molding machine of claim 1, wherein:
   the machine-ejection assembly is supported by a platen assembly, the platen assembly is configured to support, in use, a mold assembly.

3. The molding machine of claim 2, wherein:
   the auxiliary ejection-assistance assembly is configured to receive, in use, an additional force as a result of a movement of the platen assembly.

4. The molding machine of any one of claims 1 to 3, wherein:
   the auxiliary ejection-assistance assembly further includes:
   a booster cylinder;
   a control valve; and
   an intensifier cylinder,
   the booster cylinder is connected to the control valve,
   the booster cylinder is also connected with the machine-ejection assembly,
   the intensifier cylinder is also connected to the control valve,
   the accumulator bottle is connected to the control valve, and
   the intensifier cylinder is connected between a stationary platen and a movable platen.

5. The molding machine of claim 1, wherein:
   the auxiliary ejection-assistance assembly further includes:
   a booster cylinder; and
   a control valve,
   the booster cylinder is connected to the control valve;
   the booster cylinder is connected to the machine-ejection assembly; and
   the accumulator bottle is connected to the control valve (306).

6. The molding machine of claim 1, wherein the accumulator bottle is a high pressure accumulator bottle and the auxiliary ejection-assistance assembly further includes:
   a booster cylinder;
   a low pressure accumulator bottle;
   a compressor; and
   a control manifold and valve assembly,
   the booster cylinder is connected with the machine-ejection assembly, and is also connected with the control manifold and valve assembly,
   the high pressure accumulator bottle is connected with the control manifold and valve assembly,
   the low pressure accumulator bottle is connected with the control manifold and valve assembly, and
   the compressor is connected with the control manifold and valve assembly.

7. The molding machine of claim 1 further comprising an ejection rod configured to abut the molded part, the ejection rod for receiving force from the ejection actuator for ejecting the molded part.

8. The molding machine of claim 1, wherein the additional force is from a pressurized fluid stored in the auxiliary ejection-assistance assembly.

9. The molding machine of claim 8, wherein the pressurized fluid is nitrogen gas.

\* \* \* \* \*